United States Patent [19]

Cole

[11] Patent Number: 5,056,305

[45] Date of Patent: Oct. 15, 1991

[54] TOOL FOR SEPARATING CHAIN LINKS

[76] Inventor: Francisco J. Cole, P.O. Box 48, Myrtle Creek, Oreg. 97457

[21] Appl. No.: 672,122

[22] Filed: Mar. 19, 1991

[51] Int. Cl.$^5$ ............................................. B21L 21/00
[52] U.S. Cl. ........................................................ 59/7
[58] Field of Search ................ 81/388, 389, 395, 399; 59/4, 7, 11

[56] References Cited

U.S. PATENT DOCUMENTS

| | | | |
|---|---|---|---|
| 1,710,092 | 4/1929 | Hitchcock | 59/7 |
| 1,994,270 | 3/1935 | Cetrano | 59/7 |
| 2,332,607 | 10/1943 | Schroeder et al. | 59/7 |
| 2,361,971 | 11/1944 | Shipman | 59/7 |
| 2,382,447 | 8/1945 | Schaeufele | 59/7 |
| 2,440,512 | 4/1948 | Jakoubek et al. | 59/7 |
| 3,009,313 | 11/1961 | Wheeler | 59/7 |
| 3,379,005 | 4/1968 | Jones | 59/7 |
| 4,394,810 | 7/1983 | Womble | 59/7 |
| 4,429,525 | 2/1984 | Doak | 59/7 |

Primary Examiner—David Jones
Attorney, Agent, or Firm—Roger A. Marrs

[57] ABSTRACT

A tool is disclosed herein for use in chain link roller assembly and disassembly which includes an elongated lead screw having a threaded shaft manually turned by finger lever or wrench nut through a support member. A pair of jaw members operate as a movable vise having one end of a jaw pivotally connected to the support member and one end of the other jaw pivotally connected to a travelling nut in threadable engagement with the lead screw shaft. The midsections of the jaws are pivotally coupled in scissors fashion with their free ends terminating in toothed link engaging elements cooperating to releasably couple with spaced-apart chain links in a strand for releasing strand tension between the links when the jaws are drawn together by actuation of the lead screw.

9 Claims, 1 Drawing Sheet

TOOL FOR SEPARATING CHAIN LINKS

BACKGROUND OF THE INVENTION

1. Field of the Invention

The present invention relates to hand tools, and more particularly to a novel hand tool effective for connecting and disconnecting one or more links in a roller chain having a single or a multiple of tensioned strands composed of roller links or the like.

2. Brief Description of the Prior Art

Typically, sprocket chains or the like formed of a plurality of releasably connectible links have been utilized in a wide variety of situations. Such sprocket chains are commonly used in a variety of machinery in which chain drives are used to turn sprockets for one reason or another. The links or rollers of such chains are, for the most part, relatively similar in that each includes a roller mounted between parallel sides and the links in the chain are generally tensioned so that the chain will fit about the sprocket and will not work itself loose. When the chain is put into use, the hinge connection remains together and is very unlikely to separate because of the tension.

However, it often becomes necessary during the operation of the equipment to replace one or more links because of damage or for various other reasons. In such case, it is very difficult to remove the tensioned chain from the piece of equipment and carry it to a repair point, such as a workshop. Therefore, a long-standing need has existed to provide a tool which can be used on the work site and one which may be readily operated by a single person without special tools.

Several attempts have been made in the past to provide a tool for repairing sprocket chains at location or on sites where they are used. A typical example of such an approach is disclosed in U.S. Pat. No. 4,429,525. Difficulties have been encountered in using such a tool that stem largely from the fact that in many instances two or more people are employed to operate the tool and special equipment must be used as well. Furthermore, it is difficult to operate the tool in a horizontal position and as stated in the disclosure, the prior tool is used in a vertical orientation which is not always convenient at a remote work site. Also, multiple parts are used in the tool which are cumbersome and complex and which greatly complicate not only the manufacture and assembly of the tool but in its use and operation at a remote work site.

Therefore, a need exists for a simplified and uncomplicated tool which may be manually operated at a work site so that the tension of a sprocket chain may be relieved in order to permit removal of one or more links from the chain for maintenance and repair purposes.

SUMMARY OF THE INVENTION

Accordingly, the above problems and difficulties are obviated by the present invention which provides a novel hand tool for relieving the tension on a sprocket chain which comprises a threaded lead screw manually operated through a support member adapted to move a support nut along the length of the lead screw as it is rotated via a scissors or vise-like mechanism. In one form, the mechanism includes a pair of links constituting jaws which are pivotally connected together at their midsections having selected ends pivotally connected to the support nut and the support member respectively so that as the nut moves towards and away from the support member in response to shaft rotation of the lead screw, the jaws' free ends will move toward and away from each other respectively. The free ends of the respective jaws include toothed terminating elements for engaging with the links of the chain. Rotation of the lead screw produces scissors movement in the jaws so that tension of the chain is relieved, permitting removal of untensioned links between the toothed elements of the jaws.

Therefore, it is among the primary objects of the present invention to provide a novel tool for use in connecting or disconnecting one or more links in a roller chain which may be readily adjusted with a power or pneumatic impact wrench or may be hand-operated or may be hand-adjusted by the use of a socket wrench.

Another object of the present invention is to provide a novel tool for effecting the removal of rollers in a roller chain which is operated in a vertical plane or may be operated in an angular position so that the tool may be utilized in a variety of environments and tight situations.

Yet another object of the present invention is to provide a novel tool of this type which may be composed of relatively few parts and assembled in an uncomplicated manner so that the user may operate the tool conveniently and by himself without help or assistance from others.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
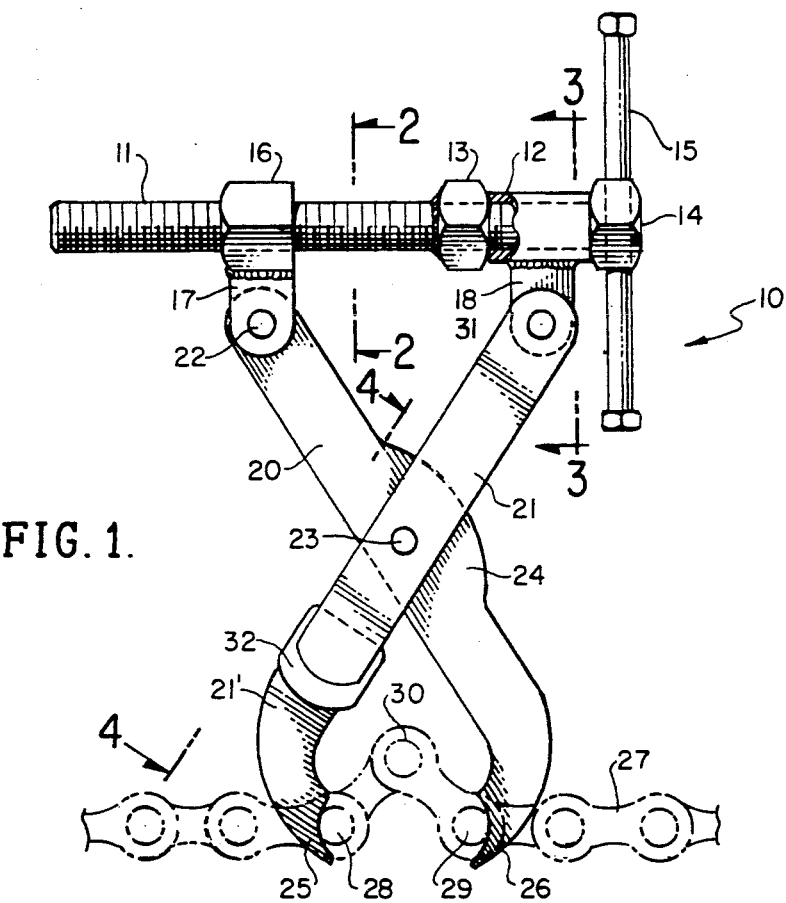
FIG. 1 is a front elevational view of the novel tool for connecting or disconnecting links in a chain in accordance with the present invention.

Referring to FIG. 1, the novel tool of the present invention is illustrated in the general direction of arrow 10 which includes a lead screw having an elongated threaded shaft 11 having a support member 12 at one end of the shaft which rotatably mounts the shaft therein. One end of the support member 12 includes a hexagon nut 13 while the opposite end of the member includes a hexagon nut 14. Ordinary or standard wrenches can be detachably connected at these locations should it be necessary for added leverage. However, nut 14 includes a sliding turn rod 15 that is grasped by the fingers of the user and turned in order to rotate the threaded shaft 11. The threaded shaft 11 movably mounts a hexagon nut 16 which travels along the length of the shaft as the shaft is rotated. The support member 12 remains stationary while the nut 16 moves back and forth along the length of the shaft.

Downwardly depending from the nut 16 and the support member 12, there are provided flanges 17 and 18 for pivotally mounting one end of a pair of jaw links 20 and 21 respectively. A typical pivot is indicated by numeral 22 which connects the end of jaw link 20 with the flange 17. The jaws 20 and 21 are connected together at their midsections by a pivot 23 so that a scissors-like or vise-like mechanism is constructed. The link 20 is provided with a lateral lobe or enlargement 24 which reinforces the midsection of the jaw link so that buckling, bending or distortion of the jaw link is avoided during usage.

The opposite ends of the jaw links from their ends coupled to the flanges 17 and 18 are formed with toothed elements, indicated by numerals 25 and 26, associated with each of the jaw links. Each of the toothed elements includes a semicircular portion which may be thrust between adjacent rollers of a link in the chain, as illustrated in broken lines, so that the semicircular face bears against rollers. For example, the chain is represented by numeral 27, while a pair of rollers is illustrated by numerals 28 and 29, and the respective semicircular faces of the toothed elements 25 and 26 bear against the rollers. As the apparatus is actuated by turning the lead screw shaft 11, the toothed elements are thrust closer together to relieve strain or tension between the rollers or links 28 and 29. By this action, the middle link of the chain, as indicated by numeral 30, may be disconnected from the chain and removed without difficulty. In order to properly seat the toothed elements 25 and 26 against the rollers, the toothed elements are disposed laterally of the longitudinal central axis of each of the jaw links so that the semicircular faces of each element face toward one another in opposing relationship. By constructing the elements in a position perpendicular to the longitudinal axis of each jaw link, the toothed element may easily be placed in the space of a chain link between rollers so that the semicircular faces will engage rollers as shown in FIG. 1.

Figure 2:
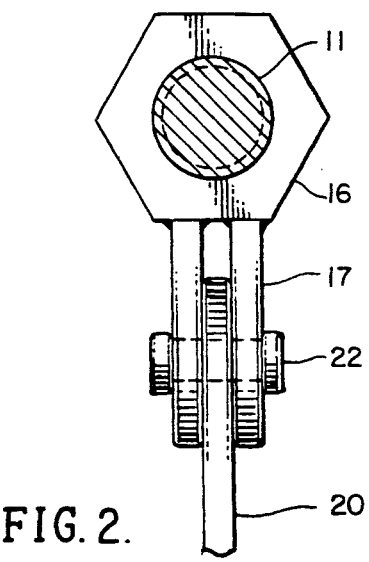
FIG. 2 is a transverse cross-sectional view of the tool shown in FIG. 1 as taken in the direction of arrows 2—2 thereof.
Figure 3:
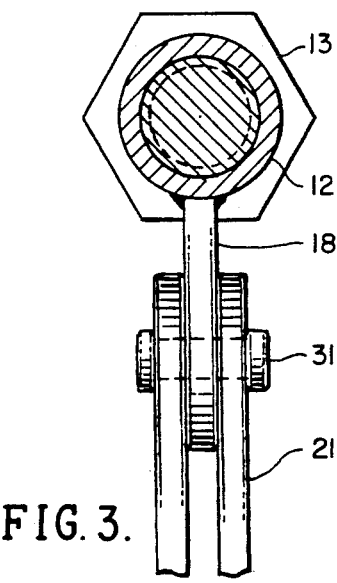
FIG. 3 is a view similar to the view of FIG. 2 taken in the direction of arrows 3—3 of FIG. 1.
Figure 4:
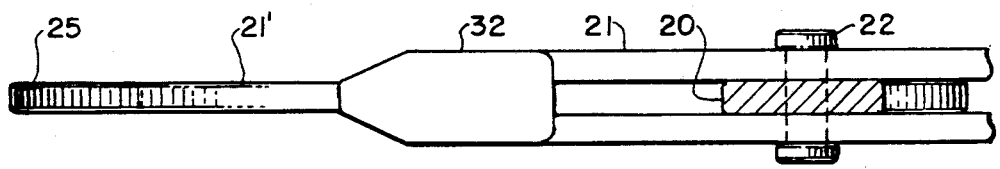
FIG. 4 is a sectional view of the jaw members used in the tool of FIG. 1 as taken in the direction of arrows 4—4 thereof.

Referring now in detail to FIG. 2, it can be seen that the flange 17 may take the form of two spaced-apart flanges into which the end of jaw link 20 is interposed and connected thereto by the pivot 22. In FIG. 3, a similar arrangement is shown with respect to the link 21 which comprises a pair of elements or components which are placed on either side of the flange 18 and joined together by the pivot 31. In FIG. 4, the opposite ends of the pair of links 21 are joined together with a single link 21' by means of a structural fitting 32. Thus, the strengthened device is increased by the fitting 32 as well as the lobe 24 and the double component construction of the flange 17, as well as the double construction of the jaw link 21.

Thus, it can be seen that a simple and uncomplicated apparatus is provided for removing tension from a portion of a link of chain. After the device has been adjusted so that the toothed elements 25 and 26 are located within the space of selected links, the handle or rod 15 is turned about the central longitudinal axis of the shaft 11 so that the threaded shaft is rotated causing the nut 16 to move either towards or away from the support member 12. When it is desired to remove link 30, the rod 15 is rotated in a counterclockwise direction in order to draw the nut 16 closer to the support member 12. This action causes the scissors-like jaw links to bring the toothed elements 25 and 26 towards one another so that the link 30 is in the position shown in broken lines in FIG. 1. At this time, the link can be removed for repair or replacement purposes. Upon replacing the link, the rod 15 is rotated in the opposite direction in order to advance the nut 16 along the threaded shaft 11 away from the support member 12. This action causes the toothed elements 25 and 26 to separate and place tension back onto the chain and the link assembly 30. Only one operator is needed to perform the link assembly or disassembly operation or procedure and no special tools are required. Should the operator or user require additional leverage, a standard wrench may be placed on the nuts 13 or 14 for holding or turning purposes.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A chain link disassembly and assembly apparatus for use with detachable sprocket or link chains comprising the combination of:

a support member having opposite ends with a bore extending between its opposite ends;

a threaded shaft disposed in said bore of said support member so as to extend out of said opposite ends;

a turning rod disposed on one end of said threaded shaft for rotating said shaft within said bore;

a threaded travelling nut movably carried on the other end of said shaft opposite the one end carrying said turning rod;

a pair of jaw links pivotally coupled at their midsections to provide a scissors-like construction;

pivots movably coupling one pair of ends of said jaw links to said travelling nut and said support member respectively; and said jaw links having toothed elements carried on the pair of jaw link ends opposite to said one pair of ends connected to said travelling nut and said support member respectively.

2. The invention as defined in claim 1 wherein:
said toothed elements include a semicircular face engageable with a link roller of said chain.

3. The invention as defined in claim 2 wherein:
one of said jaw links including a reinforcement lobe at its midsection.

4. The invention as defined in claim 3 wherein:
said toothed elements on said jaw links face each other and move towards and away from each other in response to rotation of said shaft.

5. The invention as defined in claim 4 wherein:
one of said jaw links is bifurcated to receive the other link.

6. The invention as defined in claim 5 wherein:
said one of said jaw links is reinforced by a fitting joining at said bifurcation.

7. The invention as defined in claim 6 wherein:
said travelling nut is hexagonal in shape.

8. The invention as defined in claim 7 including:
a pair of threaded hexagon nuts mounted on said threaded rod and located at the opposite ends of said support member in spaced relationship.

9. The invention as defined in claim 8 wherein:
said handle rod slidably mounts on one of said hexagon nuts.

* * * * *